(12) United States Patent
Sapozhnikov et al.

(10) Patent No.: US 8,970,994 B2
(45) Date of Patent: Mar. 3, 2015

(54) READER WITH DECOUPLED MAGNETIC SEED LAYER

(71) Applicant: Seagate Technology LLC, Cupertino, CA (US)

(72) Inventors: Victor Boris Sapozhnikov, Minnetonka, MN (US); Taras Grigoryevich Pokhil, Arden Hills, MN (US); Mohammed Sharia Ullah Petwari, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/445,916

(22) Filed: Jul. 29, 2014

(65) Prior Publication Data
US 2014/0334042 A1 Nov. 13, 2014

Related U.S. Application Data

(62) Division of application No. 13/791,334, filed on Mar. 8, 2013, now abandoned.

(51) Int. Cl.
*G11B 5/39* (2006.01)
*G11B 5/11* (2006.01)

(52) U.S. Cl.
CPC ............... *G11B 5/11* (2013.01); *G11B 5/3912* (2013.01); *G11B 5/3929* (2013.01)
USPC ........................................................... 360/319

(58) Field of Classification Search
USPC ...................................... 360/319, 324–324.2
See application file for complete search history.

(56) References Cited

U.S. PATENT DOCUMENTS

| 6,185,080 | B1 | 2/2001 | Gill |
| 6,344,953 | B1 | 2/2002 | Kautzky et al. |
| 7,719,802 | B2 | 5/2010 | Kautzky et al. |
| 7,835,116 | B2 | 11/2010 | Xue et al. |
| 7,876,535 | B2 * | 1/2011 | Machita et al. ............... 360/319 |
| 8,089,734 | B2 | 1/2012 | Miyauchi et al. |
| 8,437,106 | B2 | 5/2013 | Yanagisawa et al. |
| 8,472,147 | B2 | 6/2013 | Singleton et al. |
| 8,531,801 | B1 | 9/2013 | Xiao et al. |
| 8,537,502 | B1 | 9/2013 | Park et al. |
| 8,630,068 | B1 | 1/2014 | Mauri et al. |
| 8,638,530 | B1 | 1/2014 | Hsu et al. |
| 8,659,854 | B2 | 2/2014 | Singleton et al. |
| 2011/0007427 | A1 | 1/2011 | Qiu et al. |
| 2012/0281320 | A1 | 11/2012 | Singleton et al. |

FOREIGN PATENT DOCUMENTS

EP 821348 A2 * 1/1998
JP 2004319709 A * 11/2004

* cited by examiner

*Primary Examiner* — Will J Klimowicz
(74) *Attorney, Agent, or Firm* — HolzerIPLaw, PC

(57) ABSTRACT

An apparatus comprising a base shield and a sensor stack, wherein the base shield is separated from the sensor stack via a first soft magnetic layer that is magnetically decoupled form the base shield.

19 Claims, 7 Drawing Sheets

READER WITH DECOUPLED MAGNETIC SEED LAYER

PRIORITY CLAIM

This application is a divisional of U.S. application Ser. No. 13/791,334 filed Mar. 8, 2013, the entire disclosure of which is incorporated herein by reference.

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

Implementations described and claimed herein provide an apparatus comprising a base shield and a sensor stack, wherein the base shield is separated from the sensor stack via a first soft magnetic layer that is magnetically decoupled from the base shield. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

Figure 1:
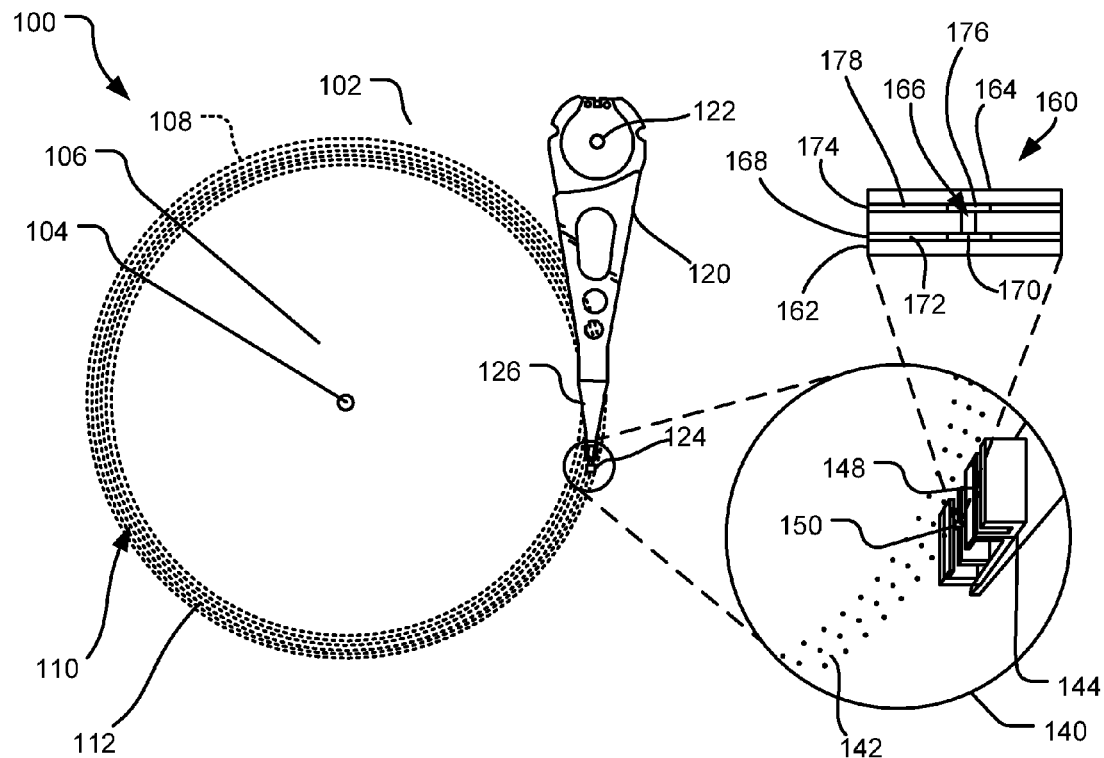
FIG. 1 illustrates a perspective view of an example recording device using a reader disclosed herein.

There is an increasing demand for high data densities and sensitive sensors to read data from a magnetic media. Giant Magnetoresistive (GMR) sensors that have increased sensitivity consist of two soft magnetic layers separated by a thin conductive, non-magnetic spacer layer such as copper. Tunnel Magnetoresistive (TMR) sensors provide an extension to GMR in which the electrons travel with their spins oriented perpendicularly to the layers across a thin insulating tunnel barrier. An antiferromagnetic (AFM) material (called the "pinning layer (PL)") is placed adjacent to the first soft magnetic layer to prevent it from rotating. AFM materials exhibiting this property are termed "pinning materials". With its rotation inhibited, the first soft layer is termed the "pinned layer". The second soft layer rotates freely in response to an external field and is called the "free layer (FL)."

To operate the MR sensor properly, the sensor should be stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. In order to increase the stiffness of the PL, "synthetic antiferromagnet" (SAF) is used in the PL. The use of the AFM/PL allows for consistent and predictable orientation of the SAF structure. Furthermore, the use of AFM/PL also provides a stable structure to enable high amplitude linear response for a reader using the MR sensor.

The assembly of the various layers the GMR/TMR sensors, as discussed above, is also referred to as a sensor stack. Such sensor stack may be surrounded by a base shield and a top shield to shield the sensor from any magnetic influences that are generated from other components of the transducer head. In such an implementation, the distance between the top shield and the base shield is referred to as the shield-to-shield spacing (SSS). The pulse width fluctuations PW50 of magnetic sensors, which determine the signal-to-noise (SNR) ratio in a recording system depends on the SSS of the head. Specifically, a reduction in the SSS leads to reduction in the value of the PW50 and therefore, an increase in the value of the SNR for the recording system. However, using SSS reduction to achieve lower PW50 has its limits.

An example reader sensor assembly disclosed herein provides alternative methods for reducing the PW50 of a reader sensor without reducing the SSS of the reader sensor. Specifically, the reader sensor assembly includes a reader stack surrounded by base shield and a top shield wherein at least one of the base shield and the top shield is separated from the sensor stack by a soft magnetic seed layer that is decoupled from the base shield or the top shield, respectively. In an alternative implementation of such reader sensor, only a portion of the soft magnetic seed layer is decoupled from the base shield or the top shield. Providing such partial decoupled seed layer allows to maintain the stability of the sensor while at the same time decreasing the PW50 of the sensor stack to improve the SNR of the recording system.

FIG. 1 illustrates a perspective view of an example recording device 100 using a reader disclosed herein. The recording device 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102 as well as in an exploded view 140. It should be understood, however, that the described technology may be employed with other types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates data tracks 142 and an expanded view of a transducer head 144 having a writer 148 and a reader sensor 150. Furthermore, an example implementation of the reader sensor 150 is illustrated by a block diagram 160. Specifically, the block diagram 160 illustrates an air-bearing surface (ABS) view of the reader sensor 150. In the illustrated implementation, the reader sensor 150 is illustrated to include a base shield 162 and a top shield 164, with a sensor stack 166 formed between the base shield 162 and the top shield 164.

Furthermore, the sensor stack 166 is separated from the base shield 162 by a base seed layer 168 that is at least partially decoupled from the base shield 162. In the illustrated implementation, a center portion 170 of the base seed layer 168 is not decoupled from the base shield 162, whereas the outer portion 172 of the base seed layer 168 is decoupled from the base shield 162. Furthermore, the sensor stack 166 is separated from the top shield 164 by a top seed layer 174 that is at least partially decoupled from the top shield 164. In the illustrated implementation, a center portion 176 of the top seed layer 174 is not decoupled from the top shield 164, whereas the outer portion 178 of the top seed layer 174 is decoupled from the top shield 164. The base seed layer 168 and the top seed layer 174 may be made of soft magnetic seed layer material and providing one or both of the base seed layer 168 and the top seed layer 174 results in decreased PW50 for the sensor 150. On the other hand, providing the partial coupled magnetic layers in the outer portions of the one or both of the base seed layer 168 and the top seed layer 174 results in increased stability of the sensor 150.

Figure 2:
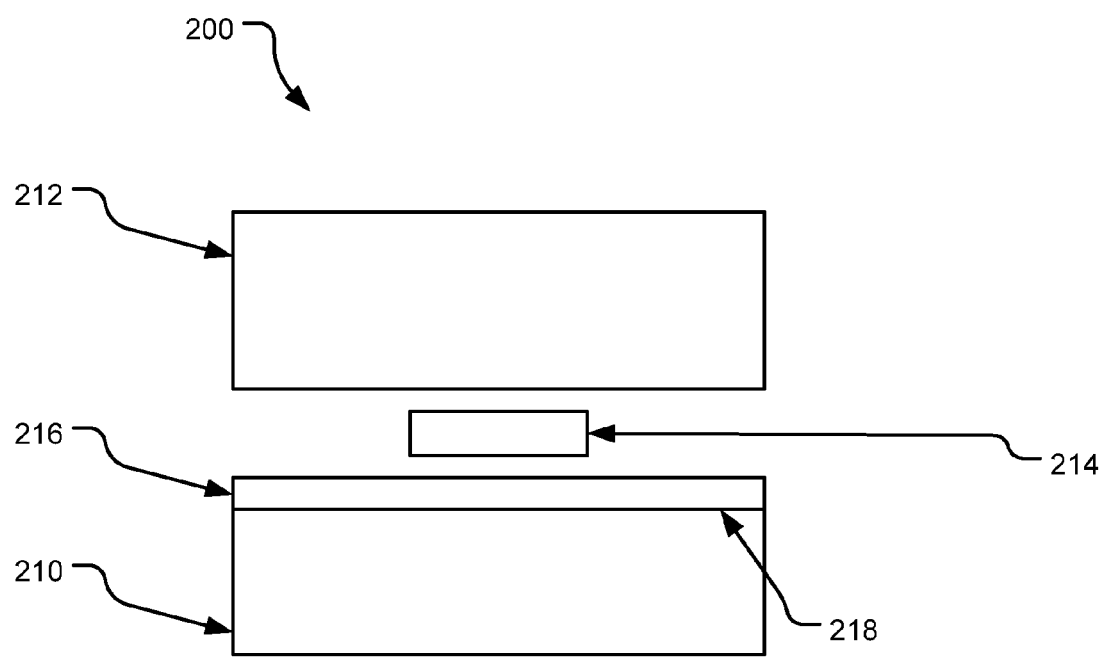
FIG. 2 illustrates a schematic block diagram of an example implementation of the reader disclosed herein.

FIG. 2 illustrates a schematic block diagram of an ABS view of an example implementation of the reader 200 disclosed herein. The reader 200 includes a base shield 210 and a top shield 212 around a sensor stack 214. The base shield 210 and the top shield 212 may be made of may be made of a magnetic material, such as NiFe, NiFeCu, NiCoFe, etc. In one implementation, the reader 200 includes a decoupled base seed layer 216 on the surface of the base shield 210. Thus, the base shield 210 is separated from the sensor stack 214 by the decoupled base seed layer 216. Specifically, the decoupled base seed layer 216 is magnetically decoupled from the base shield layer 210. In one implementation, the decoupled base seed layer 216 is made of soft magnetic material such as NiFe, NiFeCu, NiCoFe, etc and is separated from the base shield 210 by a thin layer of non-magnetic material 218 that is between the decoupled base seed layer 216 and the base shield 210. For example, such thin layer of non-magnetic material 218 may be created using a dusting of the non-magnetic material on the base shield 210 or on the decoupled base seed layer 216. Examples of such non-magnetic material include Tantalum, Tantalum compounds, etc.

The decoupled base seed layer 216 improves the PW50 of the reader 200 because the effective in-plane exchange coupling between the base shield 210 and the decoupled base seed layer 216 is very low or substantially equal to zero. Thus, the closeness of the surfaces in the decoupled base seed layer 216 results in higher ratio of the Zeeman energy to the exchange energy, wherein the Zeeman energy is the energy between the base seed layer 216 and the media from which the data is read. The higher Zeeman energy/exchange energy ratio results in easier change in the local magnetization direction as the sensor moves over the media, thus improving the PW50 of the sensor 200. The improved PW50 increases the capability of the sensor 200 to read data with higher linear density, thus allowing a recording device using the sensor 200 to provide higher linear data density and thus more cost effective data storage capabilities.

The thickness of the seed layer 216 may be 5-15 nm. The thickness of the decoupled base seed layer 216 determines the exchange of magnetic energy between the base shield 210 and the decoupled base seed layer 216. Specifically, if the decoupled base seed layer 216 is too thin, it would not be able to accommodate the magnetic flux from the media. On the other hand, if the decoupled base seed layer 216 is too thick, it reduces the PW50 gain.

Figure 3:
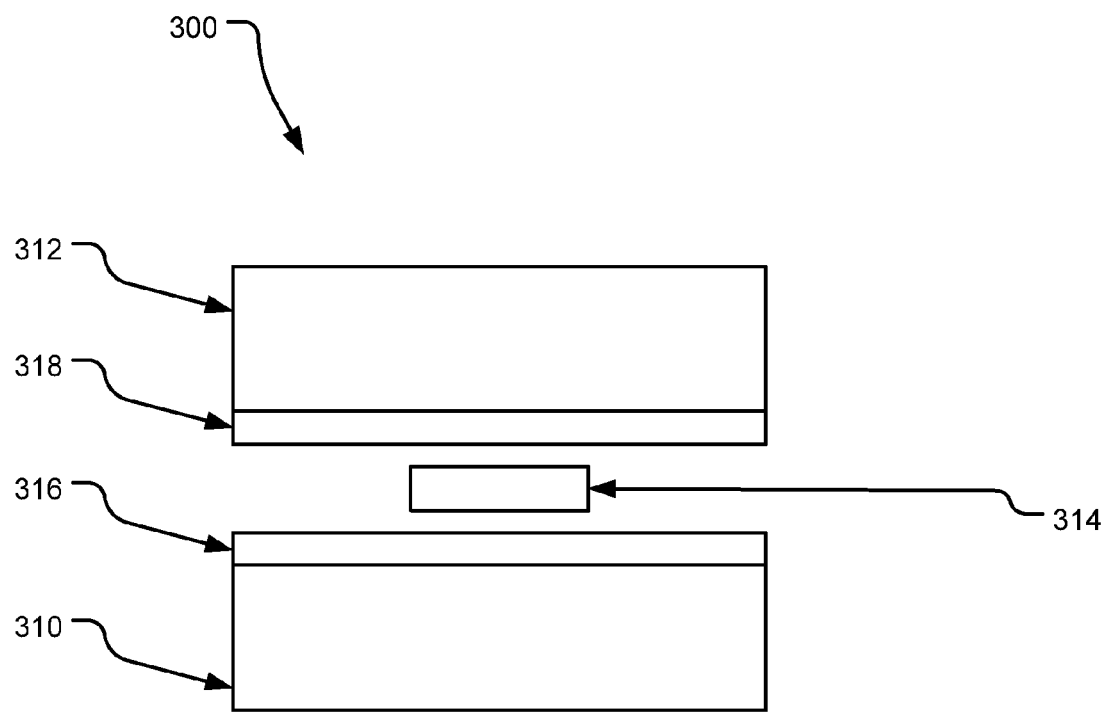
FIG. 3 illustrates another schematic block diagram of an example implementation of the reader disclosed herein.

FIG. 3 illustrates another schematic block diagram of an ABS view of an example implementation of the reader 300 disclosed herein. The reader 300 includes a base shield 310 and a top shield 312 around a sensor stack 314. The base shield 310 and the top shield 312 may be made of may be made of a magnetic material, such as NiFe, NiFeCu, NiCoFe, etc. Furthermore, the reader 300 also includes a decoupled base seed layer 316 on the surface of the base shield 310 and a decoupled top seed layer 318 on the surface of the top shield 312. Specifically, the decoupled base seed layer 316 is magnetically decoupled from the base shield 310 and the decoupled top seed layer 318 is magnetically decoupled from the top shield 312. In one implementation, each of the decoupled base seed layer 316 and the decoupled top seed layer 318 is made of soft magnetic material such as NiFe, NiFeCu, NiCoFe, etc. The forming of the decoupled seed layers 316 and 318 increases the ratio of the Zeeman energy to exchange energy on both sides of the sensor 314, resulting in improved PW50 for the reader 300.

Figure 4:
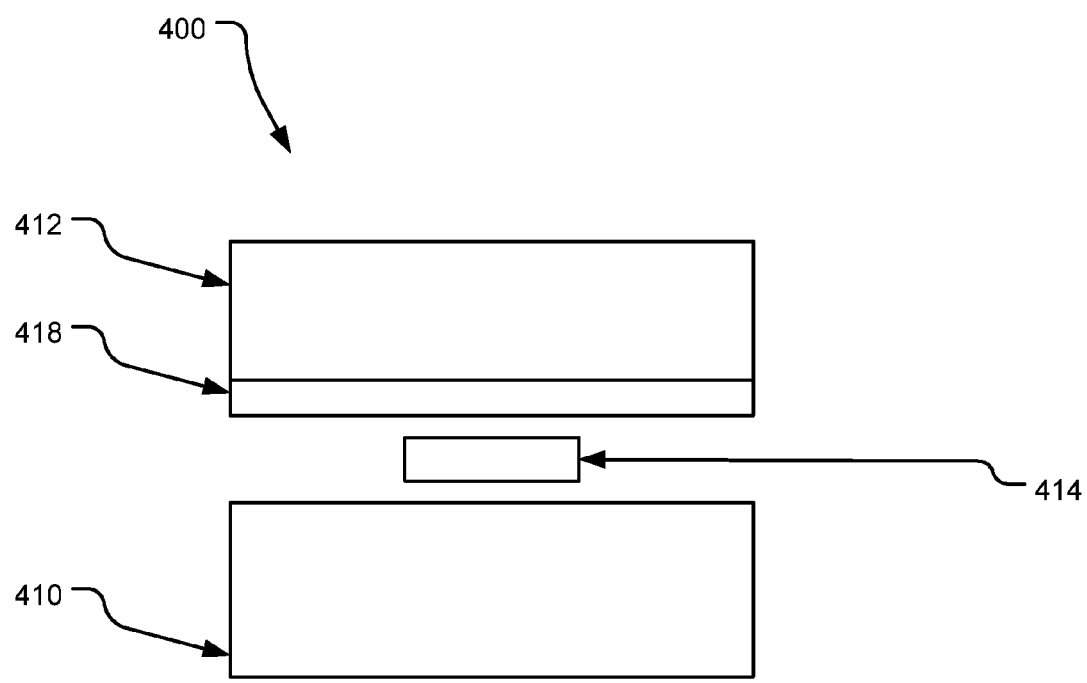
FIG. 4 illustrates another schematic block diagram of an example implementation of the reader disclosed herein.

FIG. 4 illustrates another schematic block diagram of an ABS view of an example implementation of the reader 400 disclosed herein. The reader 400 includes a base shield 410 and a top shield 412 around a sensor stack 414. The base shield 410 and the top shield 412 may be made of a magnetic material, such as NiFe, NiFeCu, NiCoFe, etc. Furthermore, the reader 400 also includes a decoupled top seed layer 418 on the surface of the top shield 412. Specifically, the decoupled top seed layer 418 is magnetically decoupled from the top shield 412. In one implementation, the decoupled top seed layer 418 is made of soft magnetic material such as NiFe, NiFeCu, NiCoFe, etc. The forming of the decoupled top seed layer 418 increases the ratio of the Zeeman energy to exchange energy on top shield side of the sensor 414, resulting in improved PW50 for the reader 400.

Figure 5:
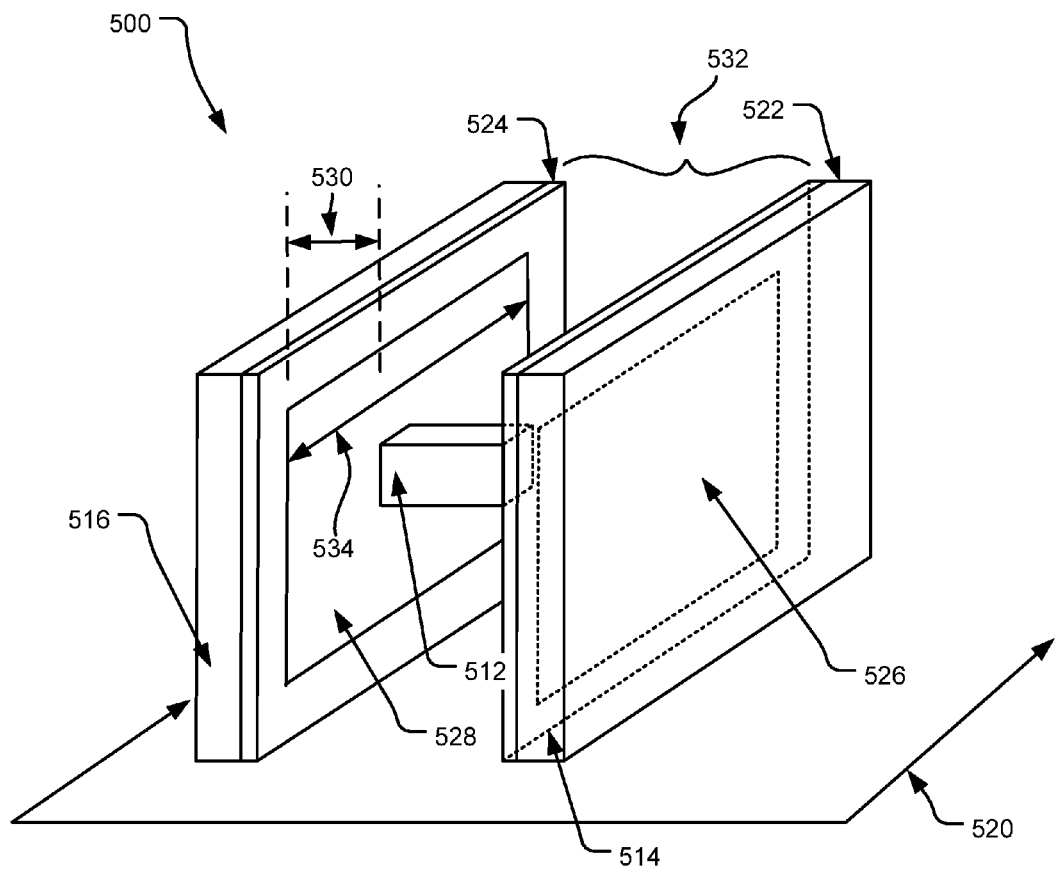
FIG. 5 illustrates another schematic block diagram of an example implementation of the reader disclosed herein.

FIG. 5 illustrates another schematic block diagram of a side view (not to scale) of an example implementation of a reader 500 disclosed herein. The reader 500 includes a sensor stack 512 with each of a base shield 514 and a top shield 516 on each side of the sensor stack 512. Note that for the clarity of illustration, the distance between the base shield 514 and the sensor stack 512 is illustrated to be different than the distance between the top shield 516 and the sensor stack 512. The reader 500 may be part of a transducer head moving on an ABS 520. The base shield 514 includes a base seed layer 522 that is formed on the surface facing the sensor stack 512. Similarly, the top shield 516 also includes a top seed layer 524 that is formed on the surface facing the sensor stack 512.

Each of the base seed layer 522 and the top seed layer 524 includes a center portion that is decoupled from the base shield 514 and the top shield 516, respectively. Specifically, the base seed layer 522 includes a decoupled base seed layer 526 that is magnetically decoupled from the base shield 514. The remaining base seed layer 522 is magnetically coupled with the base shield 514. Similarly, the top seed layer 524 includes a decoupled top seed layer 528 that is magnetically decoupled from the top shield 516. The remaining top seed layer 524 is magnetically coupled with the top shield 516. Note that in the implementation illustrated in FIG. 5, the base center portions 526 and 528 are illustrated to have a square shape, in an alternative implementation, these center portions may also have other shapes, such as rectangular, circular, oval, etc.

In one implementation, the distances between the edges of the sensor stack 512 and the edges of the decoupled center portions 526 and 528 are at least twice the SSS. As an example, for the top seed layer 524, the distance 530 between an edge of the sensor stack 512 and an edge of the top center portion 528 must be at least twice the SSS 532 (note that the distances as seen in the figures are not to scale). In other words, the total width 534 (and length) of the top center portion 528 is greater than the 4*SSS 532. Similar dimensions also apply to the base center portion 526 of the bottom seed layer 522. Such dimensions of the coupled base seed layer 522 and the top seed layer 524 ensure that the stability of the reader 500 is not adversely affected in view of the introduction of the base center portion 526 that is decoupled to the base shield 514 and the top center portion 528 that is decoupled from the top shield 516.

Because the reader 500 includes the decoupled portions in the base seed layer 522 and the top seed layer 524 in the vicinity of the sensor stack 512, the reader 500 exhibits lower PW50 and therefore higher linear density capabilities. However, because only a small portion of each of the base seed layer 522 and the top seed layer 524 is decoupled from the base shield 514 and the top shield 516 respectively, the reader 500 also provides higher stability compared to a reader where the entire base seed layer and top seed layer were decoupled from a base shield and a top shield, respectively.

Figure 6:
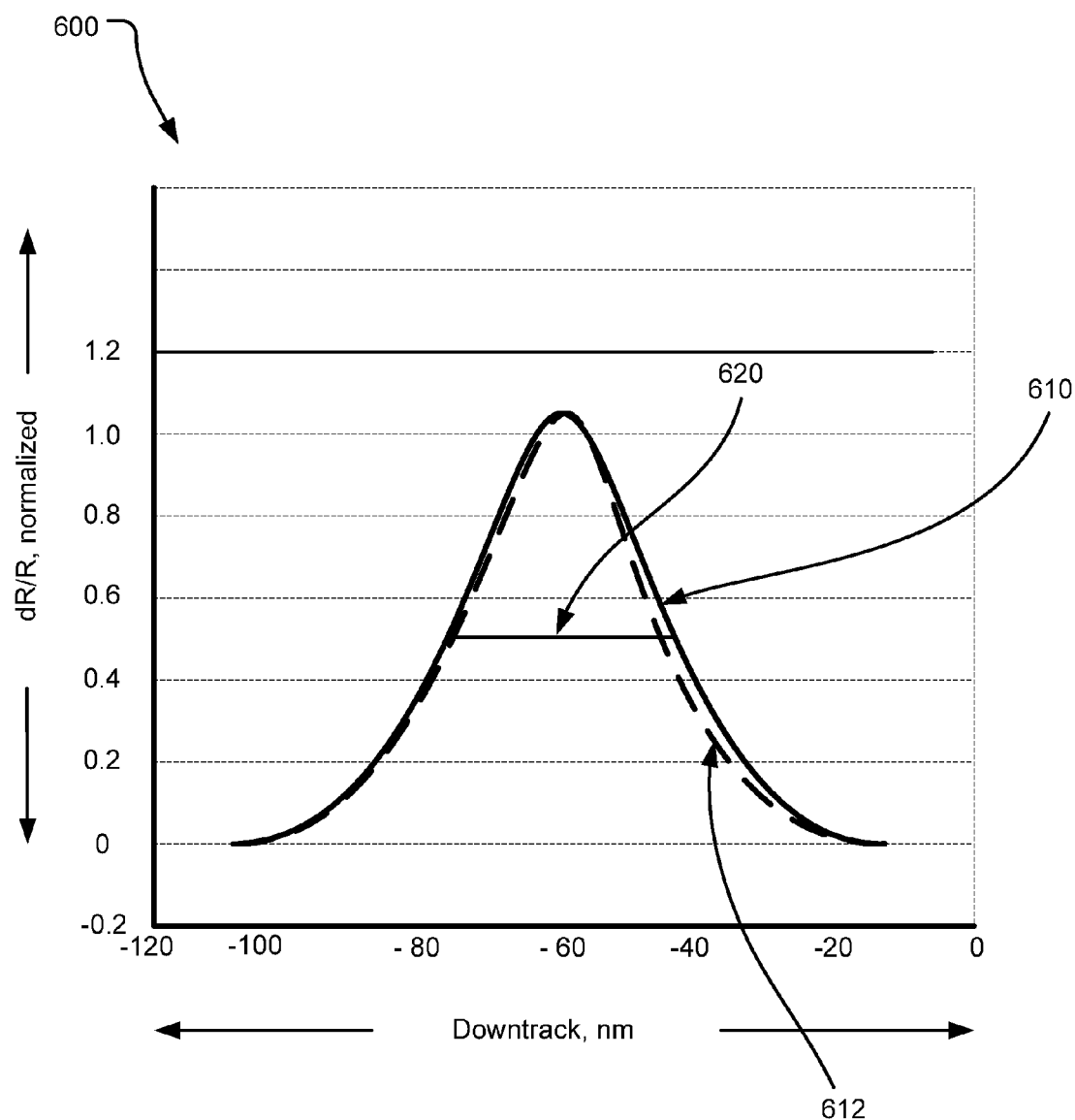
FIG. 6 illustrates a graph of a transition readback signal obtained by an example reader disclosed herein.

FIG. 6 illustrates a graph 600 of improvement in the transition readback signal obtained by an example reader disclosed herein. Specifically, the graph 600 illustrates a line 610 that represents the readback derivative without any decoupled seed layer on either of the base shield and the top shield and a line 612 that represents the readback derivative with a decoupled seed layer on the base shield. As illustrated the PW50, as illustrated by the line 620 is higher for the readback derivative 610 compared to the readback derivative 612. Specifically, in the illustrated example, the PW50 improved from 28.2 nm to 27.1 nm, resulting in increased linear density capabilities for the reader.

Figure 7:
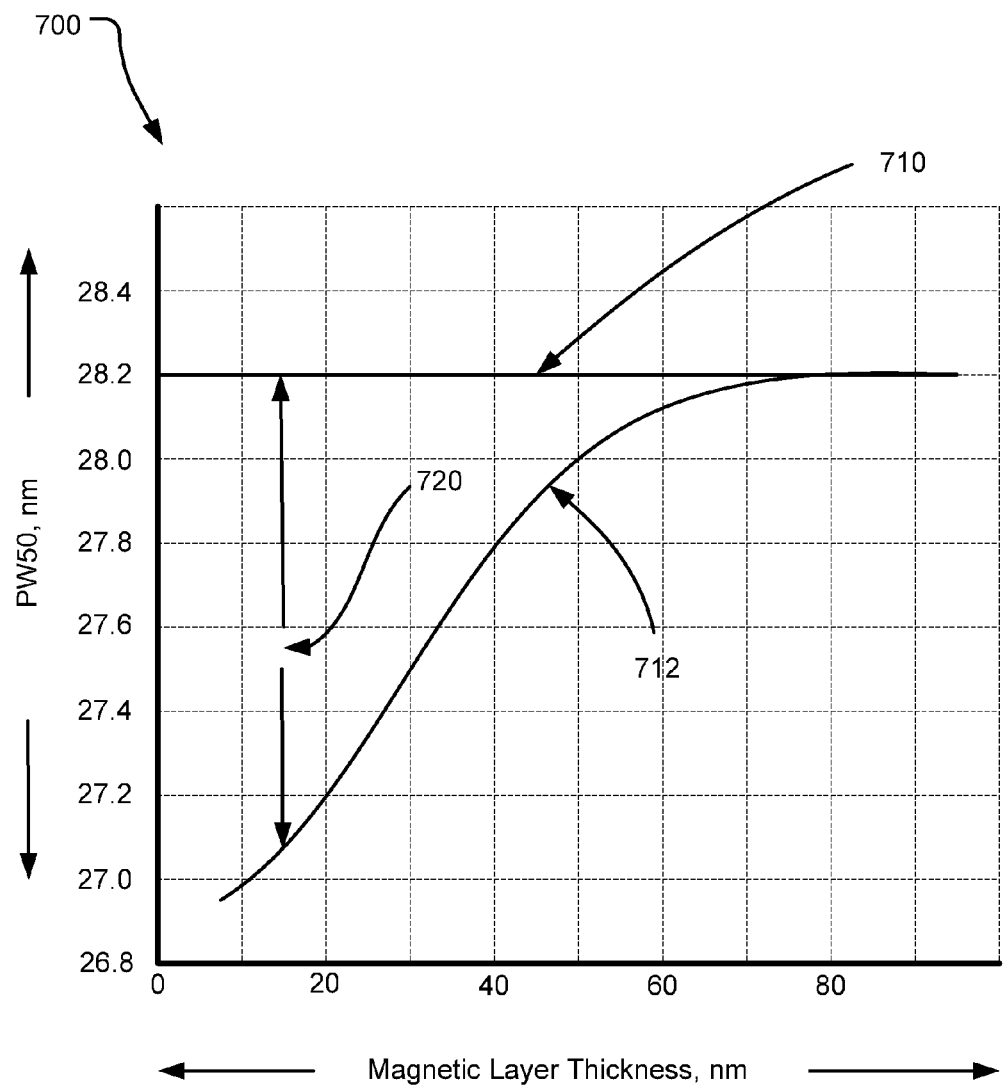
FIG. 7 illustrates a graph of the PW50 gain as a measure of thickness of the soft decoupled magnetic layer for an example reader disclosed herein.

FIG. 7 illustrates a graph 700 of modeled gain in PW50 as a function of magnetic layer thickness for an example reader disclosed herein. Specifically, graph 700 includes a line 710 illustrating the PW50 of a sensor without any decoupled seed layer between a sensor stack and a base shield layer. The line 712 illustrates the PW50 as a function of the thickness of a decoupled seed layer formed on the base shield. The difference between the line 710 and 712 is the decrease in the PW50 of the sensor resulting from the introduction of the decoupled seed layer between the base shield and the sensor stack. For example, for 10 nm thickness of the decoupled seed layer, the PW50 improves by approximately 1.1 nm (28.2 nm-27.1 nm). This improvement has also been observed experimentally. As the thickness of the decoupled seed layer increases, the decrease in the PW50 decreases. The decreased PW50 improves linear density capabilities of the reader.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
   a base shield;
   a sensor stack; and
   a base seed layer separating the base shield from the sensor stack,
   wherein the base seed layer comprises:
   a base coupled seed section that is coupled with the base shield; and
   a base uncoupled seed section that is uncoupled with the base shield, wherein the base uncoupled seed section covers a base window surrounding the sensor stack.

2. The apparatus of claim 1 further comprising a top shield, and wherein the dimension of the base window beyond the sensor stack in a direction perpendicular to the direction of the sensor stack is at least twice the dimension of the spacing between the base shield and the top shield.

3. The apparatus of claim 2, wherein the base uncoupled seed section is uncoupled from the base shield using a layer of non-magnetic material.

4. The apparatus of claim 1 further comprising a top shield located on a side of the sensor stack opposite the base shield, the top shield separated from the sensor stack with a top seed layer.

5. The apparatus of claim 4, wherein the top seed layer comprises:
   a top coupled seed section that is coupled with the top shield; and
   a top uncoupled seed section that is uncoupled with the top shield, wherein the top uncoupled seed section covers a top window surrounding the sensor stack.

6. The apparatus of claim 5, wherein the top uncoupled seed section is uncoupled from the top shield using a layer of non-magnetic material.

7. The apparatus of claim 5, wherein the dimension of the top window beyond the sensor stack in a direction perpendicular to the direction of the sensor stack is at least twice the dimension of the spacing between the base shield and the top shield.

8. The apparatus of claim 7, wherein the base coupled seed section and the top coupled seed section are made of at least one of NiFe, NiFeCu, and NiCoFe.

9. The apparatus of claim 1, wherein the sensor stack is located on a read head of a disc drive.

10. A reader sensor comprising:
    a sensor stack;
    a top shield and a base shield;
    a base seed layer separating the sensor stack from the base shield, wherein the base seed layer has a coupled section that is coupled with the base shield and an uncoupled center section that is uncoupled with the base shield; and a top seed layer separating the sensor stack from the top shield, wherein the top seed layer has a coupled section that is coupled with the top shield and an uncoupled center section that is uncoupled with the top shield.

11. The reader sensor of claim 10 wherein a dimension of the uncoupled center section of the base seed layer, in a direction perpendicular to the direction of the sensor stack, is at least twice the dimension of the spacing between the base shield and the top shield.

12. The reader sensor of claim 10 wherein a dimension of the uncoupled center section of the top seed layer, in a direction perpendicular to the direction of the sensor stack, extends beyond the sensor stack by at least twice the dimension of the spacing between the base shield and the top shield.

13. A reader sensor comprising:
   a sensor stack;
   a top shield and a base shield;
   a base seed layer separating the sensor stack from the base shield, the base seed layer having a coupled section that is coupled with the base shield and an uncoupled section that is uncoupled with the base shield, wherein a dimension of the uncoupled section, in a direction perpendicular to the direction of the sensor stack, is at least twice the dimension of the spacing between the base shield and the top shield.

14. The reader sensor of claim 13, further comprising a top seed layer separating the sensor stack from the top shield, the top seed layer having a coupled section that is coupled with the top shield and an uncoupled section that is uncoupled with the top shield.

15. The reader sensor of claim 14, wherein a dimension of the top seed uncoupled section, in a direction perpendicular to the direction of the sensor stack, is at least twice the dimension of the spacing between the base shield and the top shield.

16. The reader sensor of claim 15, wherein the top seed uncoupled section is central to the coupled section.

17. The reader sensor of claim 15, wherein the top seed coupled section is central to the uncoupled section.

18. The reader sensor of claim 13, wherein the base seed uncoupled section is central to the coupled section.

19. The reader sensor of claim 13, wherein the base seed coupled section is central to the uncoupled section.

* * * * *